United States Patent [19]

Perilleux

[11] Patent Number: 5,636,257
[45] Date of Patent: Jun. 3, 1997

[54] INSTALLATION FOR POLYMERIZATION BY IONIZATION OF STRUCTURES IN PARTICULAR OF SUBSTANTIAL DIMENSIONS CONSTITUTED PRINCIPALLY OF COMPOSITE MATERIALS

[75] Inventor: Philippe J. P. Perilleux, Saint Medard en Jalles, France

[73] Assignee: Aerospatiale Societe Nationale Industrielle, Paris, France

[21] Appl. No.: 567,577

[22] Filed: Dec. 5, 1995

[30] Foreign Application Priority Data

Dec. 5, 1994 [FR] France .................. 94 14881

[51] Int. Cl.$^6$ .......................................... G21K 5/00
[52] U.S. Cl. ........................................ 378/64; 378/68
[58] Field of Search ....................... 378/64, 197, 193, 378/195, 196, 203, 208, 68, 69

[56] References Cited

U.S. PATENT DOCUMENTS

| | | | |
|---|---|---|---|
| 3,482,096 | 12/1969 | Lewis et al. | 378/197 X |
| 3,582,650 | 6/1971 | Avery | 250/54 |
| 3,759,811 | 9/1973 | Platz et al. | 378/197 X |
| 4,066,907 | 1/1978 | Tetzlaff | 250/453 |
| 4,789,505 | 12/1988 | Beziers | 264/22 |

FOREIGN PATENT DOCUMENTS

| | | |
|---|---|---|
| 0105580 | 4/1984 | European Pat. Off. . |
| 0165118 | 12/1985 | European Pat. Off. . |
| 1296844 | 11/1962 | France . |
| 2298166 | 8/1976 | France . |
| 2488766 | 2/1982 | France . |
| 869267 | 5/1961 | United Kingdom . |
| 987884 | 3/1965 | United Kingdom . |

OTHER PUBLICATIONS

Composites Polymers, vol. 3, No. 6, Jan. 1, 1960, pp. 438–451, XP 000226334, D. Beziers et al., "Electron Beam Curing of Composites".

Primary Examiner—David P. Porta
Attorney, Agent, or Firm—Greenblum & Bernstein, P.L.C.

[57] ABSTRACT

An installation for polymerization by ionization of structures made of composite materials. The installation includes an electron beam generator positioned in a protective compartment, the generator including a linear accelerator provided with a horn and control device for the accelerator, a target for conversion of the beam of electrons into X-ray radiation and an irradiation cell. The assembly of the accelerator, horn, target, and at least a portion of the control device is carried on a platform, the platform being movable in the protective compartment in the direction of the irradiation cell. The aforementioned assembly of parts is provided, on its front surface facing the irradiation cell, with a radio-protection shield adapted to be displaced in a passage provided in a separation wall between the irradiation cell and the protective compartment. The contour of the shield is adapted to the cross section of the passage so as not to allow anything to remain between the contoured shield and the passage, but a spacing as small as possible. The installation is adapted to the application of polymerization of composite material structures.

26 Claims, 6 Drawing Sheets

INSTALLATION FOR POLYMERIZATION BY IONIZATION OF STRUCTURES IN PARTICULAR OF SUBSTANTIAL DIMENSIONS CONSTITUTED PRINCIPALLY OF COMPOSITE MATERIALS

BACKGROUND OF THE INVENTION

1. Field of the Invention

The present invention is related to an installation for polymerization by ionization of structures, in particularly of substantial dimensions, constituted principally of composite materials and more precisely for irradiation by x-rays or electrons of resins used in the composition of composite materials, in particular, although not exclusively, of complex elements of revolution such as for example cylindrical enclosures or reservoirs having hemispherical or similarly shaped ends.

2. Description of Background and Material Information

It has been known for a number of years to treat elements made out of composite materials constituted by fibers, fabrics, glass felts, Kevlar, carbon and other materials, with a radio hardening resin and assembly elements and/or inserts in particular metallic or other types of materials, the said composite material being able to present a substantial thickness by subjecting this material to irradiation by electronic radiation or x-ray radiation so as to polymerize or crosslink the resin without heating.

For more details of such a technique, one may refer to European Patent publication No. 165,118 filed in name of applicant and, more particularly, adapted for the treatment of elongated elements revolution such as tubes, the disclosure of which is hereby incorporated by reference thereto.

This document describes in particular a polymerization/crosslinking installation comprising means for producing an electron beam, means for directing the electron beam towards the element to be treated, a target adapted to generate under the effect of the electron beam an X-ray radiation, means for placing the target along the trajectory of the electrons or outside thereof so as to irradiate the element respectively with X-ray radiation or with electronic radiation, respectively, and means for carrying out a relative movement between the irradiating beam and the element such that it be subjected entirely or partially to the effect of one of the said irradiations.

The relative movement in question comprises a displacement of the element along its axis, horizontally and orthogonally to the axis of the irradiating beam, combined with the rotation of the element around its axis.

Furthermore, the dosages necessary for irradiating the resin of the composite material of the element for its polymerization being a function, in the case of X-ray radiation, of the distance between the target and the element, it is envisioned to adjust this distance and, particularly, to optimize the time of polymerization.

Two embodiments are envisioned: the element is positioned in a manner so as to be brought closer or spaced from the target, or the axis of the element is maintained fixed and the target is displaced in a direction of the elements.

In the installation shown and described in Publication No. 165,118, the electron generator is fixedly mounted in its protection protective compartment, the electron gun being arranged vertically and turned towards the ground. The scanning horn of the generator traverses through a window a horizontal shield separating the said protective compartment from the subjacent irradiation cell in which the element to be irradiated is displaced, carried by an appropriate cart.

The element, an elongated tube of composite material, can pass along under the generator horn, a conversion target being interposed between this horn and the element when one wishes to irradiate the latter with X-ray radiation.

According to a second method of adjusting the distance between the target and the element, the retractable target is furthermore movably mounted along the axis of the irradiating beam.

Although such a mounting allows for a better adjustment of the irradiation dosages necessary in particular in the case of substantial thickness of composite material, and is adapted to the type of element to be treated, namely tubular elements, it nevertheless has two major disadvantages.

On the one hand, it requires a modification of the concentration of the electron beam hitting the target when the distance between it and the outlet window of the horn is modified.

Indeed, the electron beam such as geometrically defined by the outlet window of the horn is slightly divergent such that a spacing of the target causes a correlational reduction in the concentration of the electron beam on the target and thus of the intensity of the X-ray radiation generated.

To overcome this, one could dimension the target accordingly, but the increase in the surface of the target would rapidly reach its limits, on the one hand, geometrically, and on the other hand, mechanically, because problems of cooling and retaining the target which is a thin plate subjected on its internal surface to a cooling and a strong vacuum occur.

As a result, one cannot allow for a large back and forth movement of the target around its optimum position with respect to the horn, without utilizing an overly powerful electron accelerator, which is also not satisfactory.

The requirement for correcting the correlational concentration of the electron beam leaving the horn thus renders more complex and delicate the management of the control means of the irradiation apparatus.

Furthermore, the practical limits of the displacement of the target relative to the horn considerably reduce the capacity of the irradiation apparatus.

If the latter can be appropriate to treat the tubular elements of the type shown in the document cited above whose composite portions are positioned in a fork of a distance with respect to the horn which is relatively narrow, it is also true, that from one element to another, it is necessary to modify or adjust the mounting system on the movable cart to correctly position the composite portions spaced with respect to the horn which is fixed. The irradiation apparatus cannot treat elements whose geometry is such that the portions of composite material are positioned in a range of spacing with respect to the axis of the element which is very substantial, which is for example the case with the rounded/curved, hemispherical or otherwise, end portions of the enclosures or reservoirs described above.

Of course, in such a case the difficulty can be overcome by providing, in addition to the mobility of the target with respect to the element, a mobility, along the axis of the irradiation beam, of the element on its transport cart.

Unfortunately, such a solution makes the control of the irradiation installation yet more complex, costly and delicate because, in addition, it is necessary to design special transport carts and to control them accordingly with respect to the spacing of the element with respect to the electron generator.

SUMMARY OF THE INVENTION

The present invention attempts to overcome the disadvantages of such an irradiation apparatus by perfecting it so as to render it capable of treating in particular elements of revolution that are of substantial dimensions and have portions made of composite material in a range of spacing with respect to the axis of the element which is very substantial, such as cylindrical enclosures or reservoirs having rounded/curved ends whose wall or portion of wall of composite material not only can have a varied thickness, but can be situated at a distance of several tenths of centimeters or of only several centimeters from the axis, depending upon whether one considers respectively the cylindrical shell/ring or the polar zone of the rounded/curved ends.

To this end, the object of the invention is a polymerization installation that operates by ionization of elements in particular of substantial dimensions, constituted principally of composite materials comprising:

an electron generator positioned in a protective compartment and comprising a linear accelerator provided with a horn having an irradiation window and control means of the accelerator, a target for converting a beam of electrons into X-ray radiation retractably mounted in a manner so as to be interposed or not into the output beam of the horn, an irradiation cell containing the structure to be treated, and support-presentation means of the structure opposite the electron beam or the X-ray radiation, wherein, the accelerator-horn-target assembly and a portion at least of the control means is loaded onto a movable platform in the protective compartment in the direction of the irradiation cell and along a horizontal axis parallel to the axis of the beam generated by the accelerator and wherein the moving element thus constituted is provided, on its frontal surface facing the irradiation cell, with a radio-protection buckle adapted to be displaced in a passage provided in a separation wall between the irradiation cell and the protective compartment, the contour of the shield being adapted to the cross-section of the passage such that only on as reduced a space as possible is left between the contour and the passage.

Preferably, a slight overpressure of fresh air is created in the protective compartment so as to avoid the entry of nitric compounds resulting from the irradiation cell, possibly strips/blocks for adjusting the spacing between the peripheral edge of the shield and the wall of the passage, being mounted on the shield, so as to adjust the spacing to the dimensional particularities of the wall.

The shield is preferably formed of a plurality of characteristic portions, particularly of thickness, which are variable and geometrically arranged so as to protect, from x-ray radiation and/or retro diffused electron radiation, each sensitive zone of the moving element depending on its degree of sensitivity and, this, so as to reduce as much as possible the weight of the shield.

The installation of the invention is particularly adapted to the irradiation of elongated structures of revolution and of substantial dimensions, in particular structures of a generally cylindrical forms having rounded/curved ends.

These structures are preferably placed on a cart adapted to be displaced in the irradiation cell in a manner such that the structure moves in front of the horn of the accelerator along a combined movement of translation in the axis of the structure, this axis remaining horizontal and perpendicular, and of rotation of the structure around this axis on its carrier cart, in the known manner.

Thus, without having to laterally translate the structure or its carts, the irradiation target of X can be brought much closer to in particular the curved end portions, in an efficient manner and without having to make a compensatory correction on the electron beam since the distance between the outlet window of the horn of the accelerator and the target is not modified.

The irradiation moving element can thus, by way of example, be displaced translationally in the direction of the structure to be treated over a distance of 2.5 meters, which makes it possible to irradiate structures, particularly structures of revolution, having very substantial differences of external or internal diameter along their axes.

According to yet another characteristic of the invention, the assembly formed by the horn of the accelerator and the target is mounted in a manner so as to be able to pivot around the axis of the electron beam generated, preferably on both sides of a position referred to as the origin position corresponding to the vertical position of the outlet window of the horn and of an amplitude of at least 90°.

BRIEF DESCRIPTION OF DRAWINGS

Other characteristics and advantages will become clear from the following description of one embodiment of the installation according to the invention, which description is given by way of example only and with respect to the annexed drawings in which.

DETAILED DESCRIPTION OF THE PREFERRED EMBODIMENTS

Figure 1:
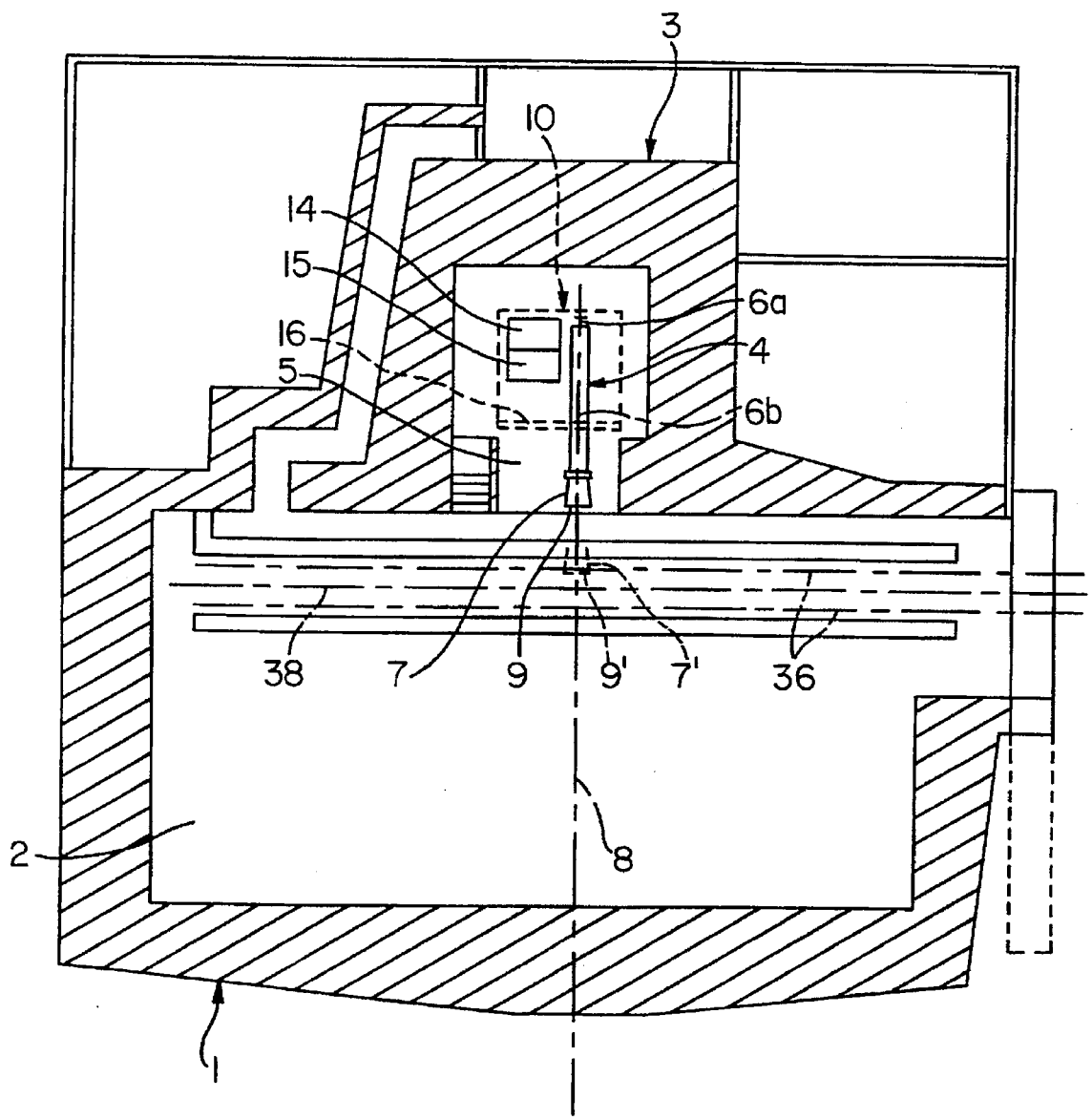
FIG. 1 is a general schematic top view of an installation according to the invention.
Figure 2:
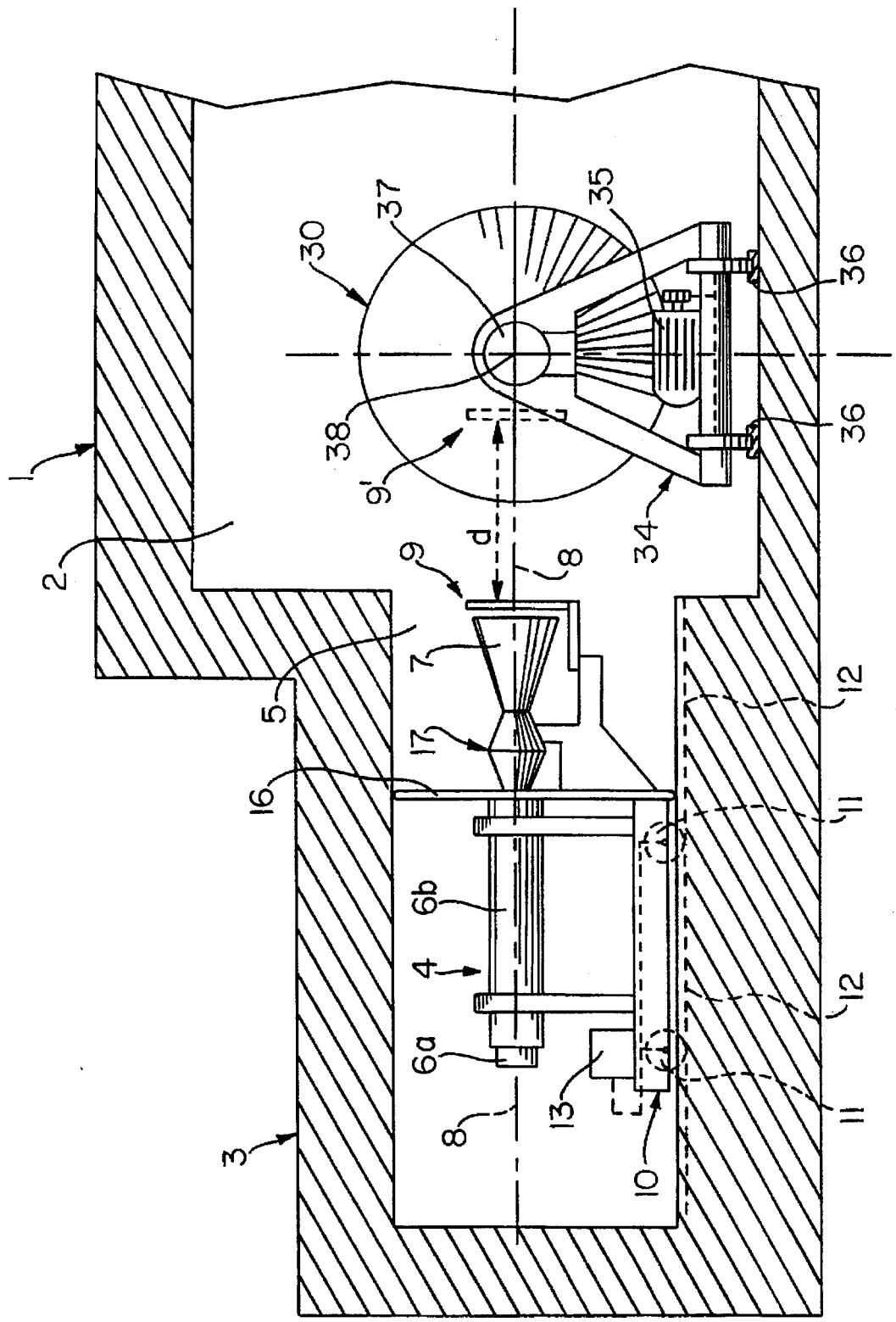
FIG. 2 is a lateral elevational view of the moving element of the installation.

FIGS. 1 and 2 illustrate, schematically, an enclosure 1 of reinforced concrete defining an irradiation cell 2 and an adjacent enclosure 3 likewise of reinforced concrete forming a protective compartment in which an electron generator 4 is positioned, the two enclosures 1 and 3 communicating through a horizontal passage 5 of rectangular cross-section.

The electron generator comprises an electron gun 6a-accelerating section 6b assembly provided at its end with a scanning horn 7 comprising an outlet window of narrow rectangular form positioned generally vertically to the axis, shown at 8, of the electron beam, the electron gun section assembly being positioned horizontally in the protective compartment 3 in the direction of the irradiation cell 2.

Immediately before the horn 7 a conversion target 9 can be positioned, in a known manner, retractably mounted if one wishes to substitute for a beam of irradiation electrons a beam of irradiation by X-rays.

According to the invention, the assembly formed by the electron gun 6a and the accelerating section 6b, the horn 7, the target 9 and all or part of the control means of the accelerator, is mounted on a platform 10 which is movable in the protective compartment 3 along an axis parallel to the axis 8 of the electron beam generated by the accelerator.

Platform 10 is simply shown schematically in the drawings and is displaced by means of rollers 11 rolling on fixed rail shown schematically at 12 installed in the slab of the floor of the protective compartment 3. Platform 10 is moved for example by means of carried motors 13, the dashed-lines connecting the means 13 to the rollers 11 simply illustrating the displacement function of the platform 10 by the means 13, it being understood of course that the technical solutions known to one of skill in the art are possible so as to displace the moving element constituting a platform 10 and all of the elements that it carries along the rails 12.

The control means of the accelerator loaded/mounted on the movable platform 10 are not shown in FIG. 2.

Figure 3:
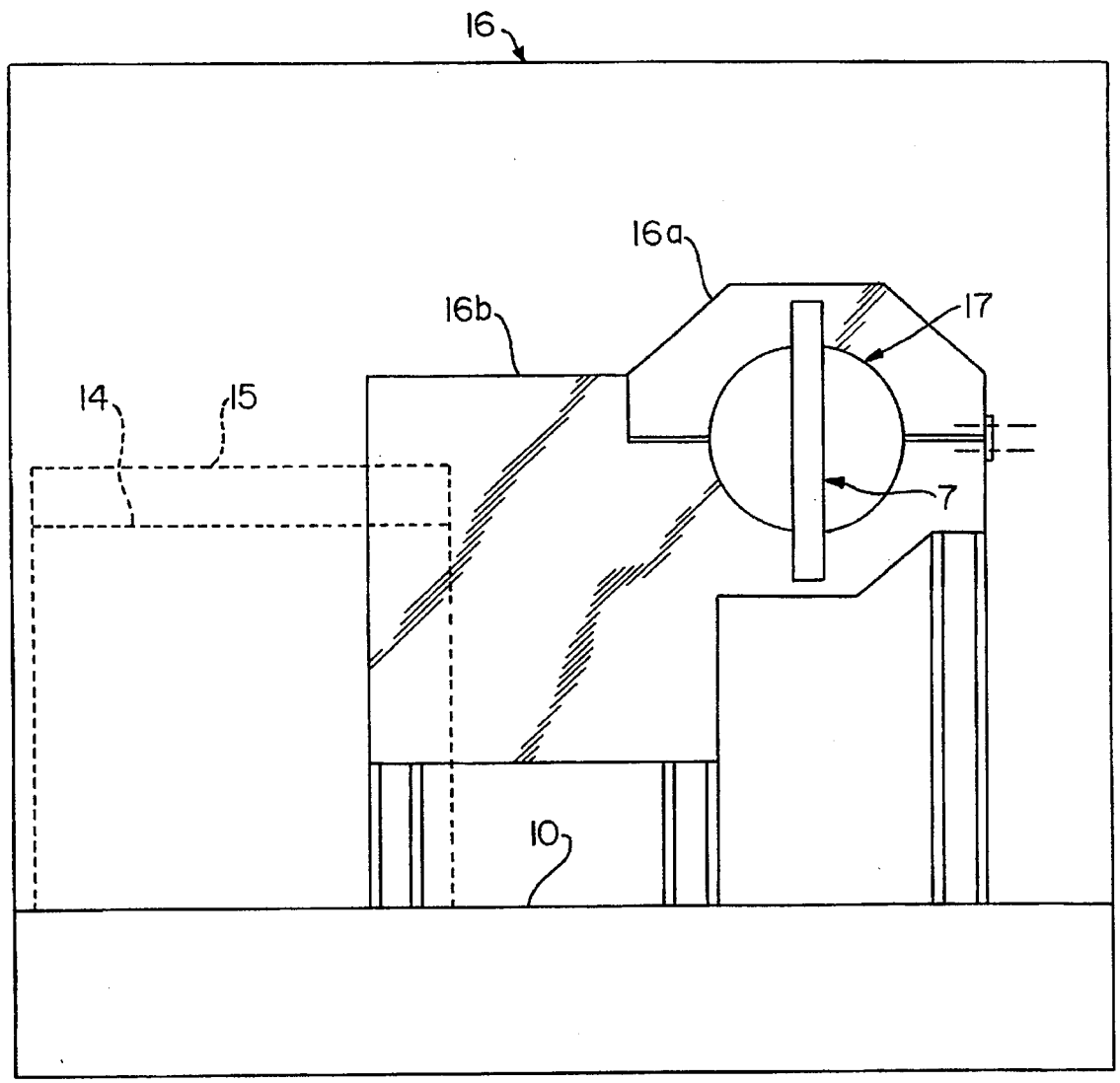
FIG. 3 is front view of one embodiment of a shield, mounted on the moving element.
Figure 4:
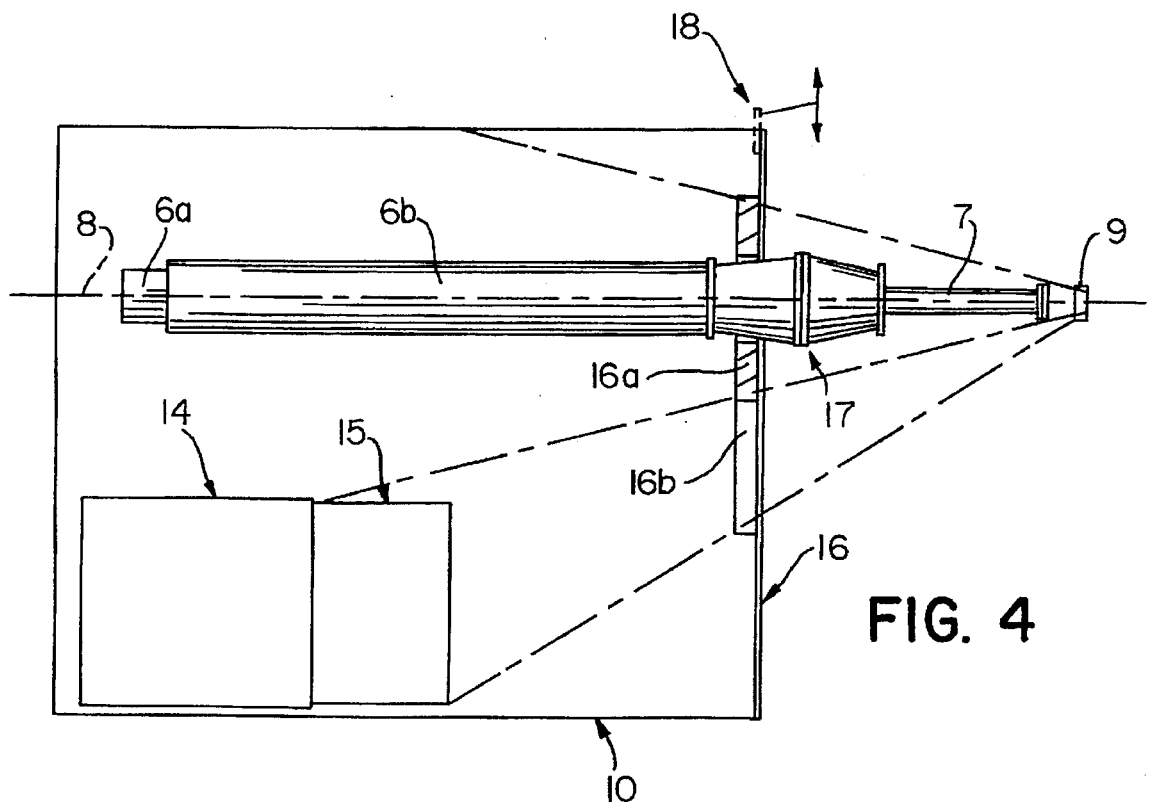
FIG. 4 shows a top view of the apparatus of FIG. 3 along a horizontal cross-section in the axis of the gun of the accelerator.
Figure 5:
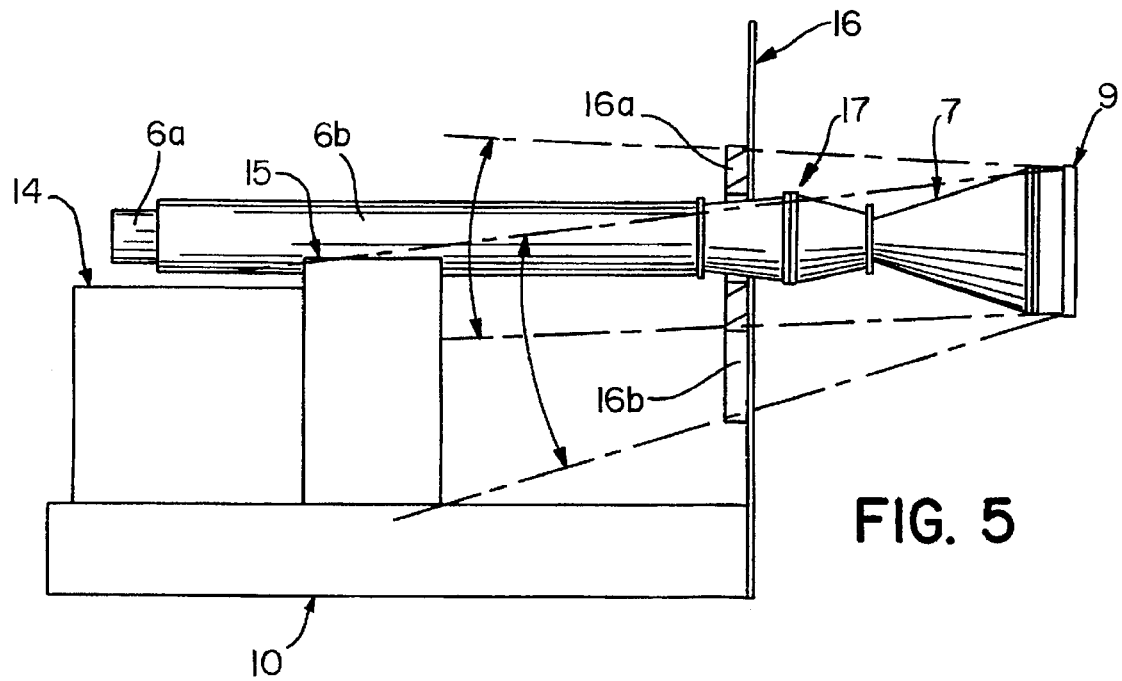
FIG. 5 shows a left lateral elevational view of the apparatus of FIG. 3 along a vertical cross-section in the axis of the gun of the accelerator.

These means comprise, among others, and as illustrated schematically in FIGS. 3–5 which are complementary views of a moving element of FIG. 2, the container 14 of a klystron feeding the electron gun 6a and the delay line 15 of the modulator of the accelerator.

These means are particularly sensitive to the electromagnetic radiation, particularly X-ray radiation retro-diffused by target 9 in the direction of the protective compartment 3.

Therefore, according to another characteristic of the apparatus of the invention, the moving element is provided on its front surface facing the irradiation cell 2 with a shield 16 arranged vertically, affixed on platform 10, and surrounding, in the embodiment shown, the electron accelerator at the height of the scanning assembly 17 of the electron beam interposed between the accelerator section 6b and the horn 9.

Shield 16 is of a generally rectangular form and corresponds in shape and dimension to the cross-section of passage 5. The space between the edges of the shield 16 and the wall of passage 5 must be as small as possible on the one hand, to avoid to the maximum the penetration in the protective compartment 3 of the X-ray radiation and, on the other hand, so as to make it possible to correctly establish in the protective compartment 3 a slight overpressure of fresh air forbidding in particular nitric compounds generated in the irradiation cell, generally itself under a slight vacuum, to penetrate into the protective compartment 3.

To perfect the reduction of the leaks between the edges of the shield 16 and the wall of passage 5, the edges or certain of them, depending on the quality, geometrically speaking, of the surface of the opposite passage, can be provided, as shown in dashed lines at 18 in FIG. 4, with an adjuster/or strip slidably mounted on the shield and making it possible to adjust more finely in situ the spacing separating the shield and the wall of the passage.

The shield 16 is, for example, a plate of steel.

To reduce the weight of shield 16, it is preferably constituted by several portions of different thickness and of a shape and arrangement which are appropriate to the aims sought. Thus, to efficiently preserve the sensitive zones, particularly the accelerator cross-section 6b, the container of the klystron 14 and the delay line 15, the shield 16 comprises portions of a substantially increased thickness while the remainder of the shield can have a reduced thickness.

For example, as shown in FIGS. 3–5, the shield 16 comprises a first portion 16a of reinforced thickness, ten centimeters, for example, of a substantially annular shape and surrounding the scanning section 17 and a second portion 16b, of the same thickness, of a generally rectangular shape and substantially positioned at the center of the shield in the extension of the portion 16a, the rest of the shield having, for example, a thickness on the order of one a centimeter.

As can be observed in FIGS. 4 and 5, the portion 16a forms a screen for the accelerator cross-section 6 against X-ray radiation retro-diffused by the target 9. Apparatus 14 and 15 are protected both by the portion 16a and the portion 16b.

The shapes, dimensions and arrangements in the shield of the sections of reinforced thickness will of course be a function of the situation and of the particular arrangement of the circuits or the apparatus that are carried by the platform 10 and which must be the object of a reinforced protection.

Figure 7B:
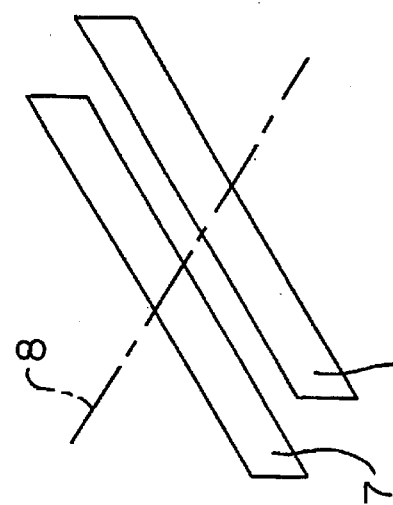
Figure 7A:
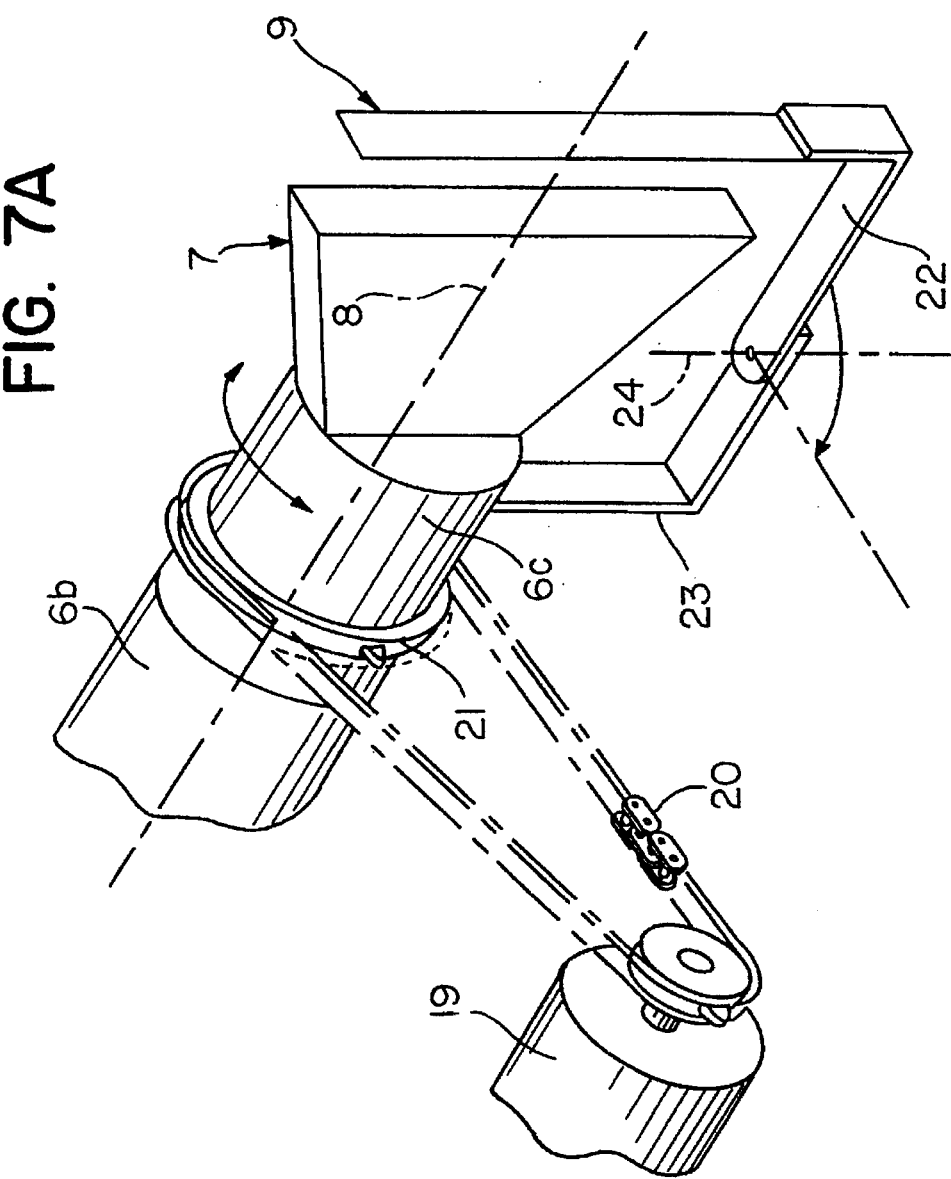

FIGS. 7A and 7B illustrate very schematically an alternative embodiment making it possible to pivot around the axis 8 of the accelerator, the horn-target assembly, in one direction or the other, by at least 90°, from the position referred to as normal, namely the vertical position of the outlet window of the horn 7 (FIG. 7A).

To this end, horn 7 is affixed to a linkage ring 6c interposed between the horn 7 and the accelerating section 6b and rotatably mounted on the latter.

The rotation of the ring 6c is carried out, for example, by an electric motor 19 mounted on the platform 10 and driving ring 6c by a chain 20 and a sprocket 21 affixed to the ring.

Target 9 is positioned facing the outlet window of the horn 7 and, in a known manner, is retractably mounted laterally when the apparatus is simply utilized for an electronic irradiation.

To this end, target 9 is mounted to the end of an arm 22 positioned under the horn 7 and adapted to pivot on a support 23 by any appropriate means (not shown) around a vertical axis 24 perpendicular to the axis 8. Support 23 is affixed to the rotating ring 6c.

In the working position, the target 9 has a plane perpendicular to the axis 8.

It is clear that by activating motor 19, in one direction or the other, the ring 6c-horn 7-target 9 assembly will pivot around the axis 8 in one direction or the other to the degree desired.

It has been symbolically shown in FIG. 7B the position of the pair horn 7-target 9, after rotation of 90°, the horn then being horizontal.

The accelerator is furthermore provided, in the known manner, with a calorimetric target, retractable in the manner of target 9 and thus carried by support 23, such a calorimetric target not being shown in the drawings.

Figure 6:
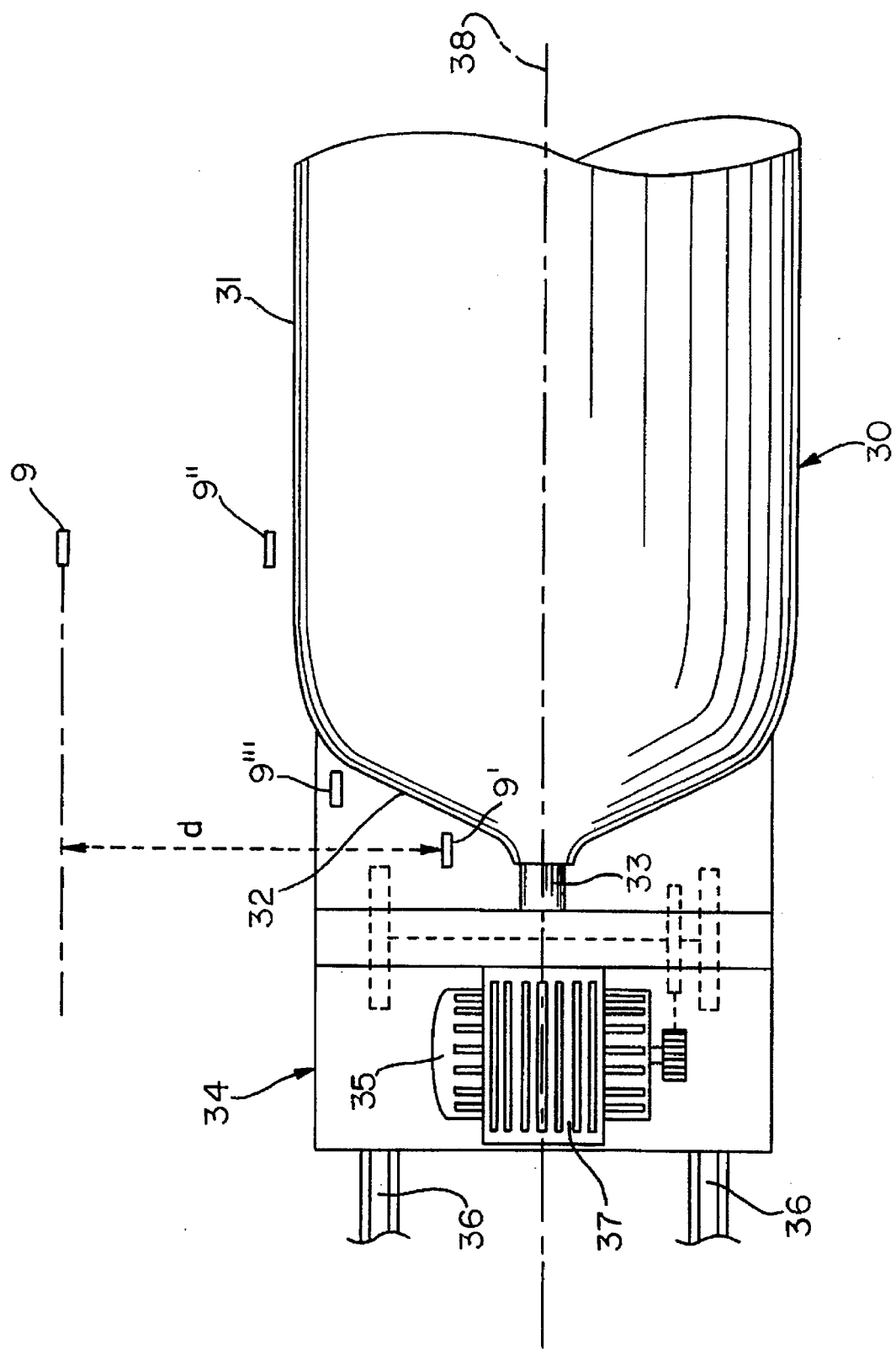
FIG. 6 is a top view of a schematic illustrating the treatment of a cylindrical structure having curved ends, and FIGS. 7A and 7B schematically illustrate the rotational mounting of the horn of the accelerator and the target around the axis of the beam generated.

The structure to be irradiated schematically shown at 30 in FIGS. 2 and 6 has a cylindrically shaped shell 31 and curved ends 32. It is supported horizontally at its two ends between two headstocks/footstocks of which one 33 is driving, on a cart 34 provided with drive means 35 along the rails 36 extending in the irradiation cell 2 perpendicularly to the axis 8 of the electron beam.

The rotation of the structure 30 on the cart 34 is assured by a motor 37.

Possibly, the headstocks/footstocks 33 for support-drive of structure 30 are adjustably mounted in height on cart 34.

Structure 30 is in a known manner presented in front of horn 7 with its axis 38 horizontal and perpendicular to the axis of the electron beam 8 and moves in front of the horn the way of a double movement, i.e., translation along the rails 36 and rotation around its axis 38.

In FIGS. 1, 2 and 6, there has been shown (at 7, 9) the initial position, at rest, of the horn and the target of the accelerator, the target 9 being positioned adjacent to the opening of passage 5 into the irradiation cell 2, while the shield 16 is positioned at the other end of the passage, on the side of protective compartment 3.

At 7' and 9' are shown the extreme advanced positions of the horn and of the target with respect to the axis 38 of the structure to be irradiated. The extent d of the displacement of the moving element (FIGS. 2 and 6) is on the order of about 2.5 meters, for example.

As shown in FIG. 6, depending on the particular form of the structure 30 to be irradiated, the target 9 can be brought closer to the external wall of the structure both to the width of the shell 31 (target 9") and the width of the curved portions 32 (target 9'" and 9').

Of course, the displacement of platform 10 is coupled with that of the displacement of cart 34 on its rails 36.

In a general manner, the various translational movement of the cart 34 and the platform 10, and the rotational movement of structure 30 are programmed and controlled by the accelerator pilot as a function of the X-ray radiation dosages sent to the various portions of the composite material of the structure, i.e., the portions having in a general manner a surface mass greater than 4 g/cm$^2$.

As indicated above, the displacement of target 9 with respect to the structure 30 to be irradiated requires no adjustment of the incident electron beams since it is the horn 7-target 9 assembly which is displaced as a block.

All along its displacement in passage 5, the shield 16 ensures permanently its protecting role by sliding in the passage while substantially preserving the same spacing or clearance between itself and the wall of the passage, this clearance being as small as possible.

The translational displacement of platform 10 is ensured at a slow velocity and with programmed acceleration and deceleration ramps so as not to cause prejudicial vibrations to certain components of the carried material, particularly those which are fragile.

The displacement of the platform can occur preferably at two velocities, one relatively rapid, (the accelerator not being in service) to bring target 9 into the work zone and the other, slower, in the course of irradiation of the structure.

The invention is applicable to the irradiation of structures of revolution (cylindrical, conical, spherical, etc.), but likewise to the irradiation of structure of any shape and dimension and which is not of revolution. By structure and shape is meant any body or element which is simple or complex, width (having variable width or not) or massive, comprising or not inserts of a different nature than that of the resin to be polymerized.

The pivoting of the horn 7-target 9 assembly around the axis 8 of the incident electron beam, by virtue of motor 19, makes it possible to orient the spectrum of emission of X-ray radiation with respect to the portion of the structure to be irradiated. This allows for a different treatment of the different zones of the structure as well as a more efficient and targeted treatment of the structure or parts of the structure that is elongated, i.e., positioned horizontally at the moment of irradiation.

The pivoting of the horn 7 around axis 8 can, of course, be effectuated with the target 9 retracted laterally, the apparatus functioning during electronic radiation.

Finally, the invention is not, of course, limited to the embodiments shown and described above but extends instead to all variations, and particularly as they relate to the technology of forming various means for translating the platform 10.

The instant application is based upon French patent application No. 94 14881 filed Dec. 5, 1994, the priority of which is claimed under 35 U.S.C. S 119, the disclosure of which is hereby expressly incorporated by reference thereto.

What is claimed:

1. An installation for polymerization by ionization of structures, said installation comprising:

a protective compartment;

an electron generator positioned within said protective compartment, said electron generator including a linear accelerator with a horn having an irradiation window;

a device for controlling said accelerator;

a target for converting an electron beam output from said horn of said electron generator into X-ray radiation, said electron beam projecting along a predeterminate axis;

an arrangement for mounting said target for selective movement into and out of said electron beam;

an irradiation cell for containing a structure to be treated;

a passage, having an internal periphery of a predeterminate cross-sectional size and shape, communicating with said irradiation cell and with said protective compartment;

means for supporting the structure to be treated in a manner to face said electron beam or X-ray radiation;

an assembly comprising a plurality of members, said members including said accelerator, said horn, said target, and at least a portion of said device for controlling said accelerator;

a support to which said assembly is mounted;

means for moving said support in said protective compartment toward and away from said irradiation cell in a direction parallel to said electron beam axis;

said assembly having a front, said front facing said irradiation cell, said assembly further comprising a radio protection shield positioned on said front of said assembly and being displaceable within said passage by means of said means for moving said support, said shield conforming to said size and shape of said internal periphery of said passage to create a minimal spacing between said shield and said passage, said shield constituting a separation wall between said irradiation cell and said protective compartment.

2. An installation according to claim 1, further comprising:

a slight over-pressure of fresh air in said protective compartment for facilitating avoidance of entry of nitric compounds formed in said irradiation cell.

3. An installation according to claim 1, further comprising:

adjusters mounted for adjustment on said shield for adjusting said spacing between said shield and said passage.

4. An installation according to claim 2, further comprising:

adjusters mounted for adjustment on said shield for adjusting said spacing between said shield and said passage.

5. An installation according to claim 1, wherein:

said shield comprises a plurality of portions having different thicknesses geometrically arranged with respect to said assembly for facilitating protection of particular members of said assembly from X-ray radiation and/or retro-diffused electron radiation.

6. An installation according to claim 2, wherein:

said shield comprises a plurality of portions having different thicknesses geometrically arranged with respect to said assembly for facilitating protection of particular members of said assembly from X-ray radiation and/or retro-diffused electron radiation.

7. An installation according to claim 3, wherein:

said shield comprises a plurality of portions having different thicknesses geometrically arranged with respect to said assembly for facilitating protection of particular members of said assembly from X-ray radiation and/or retro-diffused electron radiation.

8. An installation according to claim 4, wherein:

said shield comprises a plurality of portions having different thicknesses geometrically arranged with respect to said assembly for facilitating protection of particular members of said assembly from X-ray radiation and/or retro-diffused electron radiation.

9. An installation according to claim 1, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

10. An installation according to claim 2, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

11. An installation according to claim 3, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

12. An installation according to claim 4, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

13. An installation according to claim 5, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

14. An installation according to claim 6, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

15. An installation according to claim 7, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

16. An installation according to claim 8, wherein said structure to be treated being a structure of revolution about an axis perpendicular to said axis of said electron beam, said installation further comprising:

means for moving said structure to be treated in said irradiation cell in front of said horn of said accelerator in translation along said perpendicular axis and in rotation in either direction about said perpendicular axis; and means for controlling movement of said support of said assembly and movement of said structure to be treated.

17. An installation according to claim 1, further comprising:

means for rotating said horn and target about said predeterminate axis in either direction an amount at least equal to 90°.

18. An installation according to claim 3, further comprising:

means for rotating said horn and target about said predeterminate axis in either direction an amount at least equal to 90°.

19. An installation according to claim 5, further comprising:

means for rotating said horn and target about said predeterminate axis in either direction an amount at least equal to 90°.

20. An installation according to claim 7, further comprising:

means for rotating said horn and target about said predeterminate axis in either direction an amount at least equal to 90°.

21. An installation according to claim 9, further comprising:

means for rotating said horn and target about said predeterminate axis in either direction an amount at least equal to 90°.

22. An installation according to claim 11, further comprising:

means for rotating said horn and target about said predeterminate axis in either direction an amount at least equal to 90°.

23. An installation according to claim 13, further comprising:

means for rotating said horn and target about said predeterminate axis in either direction an amount at least equal to 90°.

24. An installation according to claim 15, further comprising:

means for rotating said horn and target about said predeterminate axis in either direction an amount at least equal to 90°.

25. An installation according to claim 1, wherein:

said support comprises a platform to which said assembly is mounted; and said means for moving said support comprises means for moving said platform in a horizontally.

26. An installation according to claim 1 in combination with said structure to be treated, said structure made of a composite material.

* * * * *